US 8,251,084 B2
Aug. 28, 2012

(12) United States Patent
Brown (54) SWIVEL SAFETY BREAKAWAY CONNECTOR

(75) Inventor: Robin J. Brown, Labadie, MO (US)

(73) Assignee: Husky Corporation, Pacific, MO (US)

( * ) Notice: Subject to any disclaimer, the term of this patent is extended or adjusted under 35 U.S.C. 154(b) by 328 days.

(21) Appl. No.: 12/381,922

(22) Filed: Mar. 18, 2009

(65) Prior Publication Data

US 2011/0094602 A1    Apr. 28, 2011

Related U.S. Application Data

(63) Continuation-in-part of application No. 11/503,562, filed on Aug. 11, 2006, now Pat. No. 7,575,023.

(51) Int. Cl.
*F16L 37/32* (2006.01)

(52) U.S. Cl. ............... 137/68.11; 137/614.04; 285/279; 285/282

(58) Field of Classification Search ............... 137/68.14, 137/614.03, 614.04, 234.6; 285/1, 2, 3, 68, 285/69, 272, 275–282; 251/297
See application file for complete search history.

(56) References Cited

U.S. PATENT DOCUMENTS

| | | | |
|---|---|---|---|
| 1,410,218 A | 3/1922 | Palmer | |
| 1,446,006 A * | 2/1923 | Fletcher | 285/269 |
| 1,861,442 A * | 6/1932 | Hammerstein | 222/514 |
| 2,048,388 A | 7/1936 | Johnsen | |
| 2,135,221 A | 11/1938 | Scheiwer | |
| 2,242,303 A * | 5/1941 | Irmischer | 285/282 |
| 2,452,430 A | 10/1948 | Clark et al. | |
| 2,455,544 A | 12/1948 | Yonkers | |
| 2,503,281 A * | 4/1950 | Lynch et al. | 285/181 |
| 2,536,702 A | 1/1951 | Scheiwer | |
| 2,599,935 A | 6/1952 | Pasker | |
| 2,631,872 A | 3/1953 | Wurmser | |
| 2,642,297 A | 6/1953 | Hanna | |
| 2,699,342 A * | 1/1955 | May | 285/264 |
| 2,777,716 A | 1/1957 | Gray | |
| 2,860,893 A | 11/1958 | Clark | |
| 2,898,926 A | 8/1959 | Tsiguloff | |
| 2,906,280 A | 9/1959 | Mount | |
| 3,085,589 A | 4/1963 | Sands | |
| 3,107,691 A * | 10/1963 | Schwarz | 137/614.19 |
| 3,122,162 A | 2/1964 | Sands | |
| 3,138,393 A | 6/1964 | Livingston | |
| 3,317,220 A | 5/1967 | Bruning | |
| 3,334,860 A | 8/1967 | Bolton, Jr. | |
| 3,715,099 A | 2/1973 | Shendure | |
| 3,741,521 A | 6/1973 | Tatsuno | |
| 3,836,114 A | 9/1974 | Norton et al. | |
| 3,918,679 A | 11/1975 | Silvana | |

(Continued)

*Primary Examiner* — John Rivell
*Assistant Examiner* — Matthew W Jellett
(74) *Attorney, Agent, or Firm* — Paul M. Denk (57) ABSTRACT

A safety breakaway connector has a male fitting and a female fitting inserted into one another. The female fitting includes a swivel that rotates about an angle to a breakaway portion of the invention. The swivel has a female portion connected to the breakaway portion and a male portion that pivotally connects to a nozzle. The male portion has an axis spaced apart from the axis of the breakaway portion. The male portion rotates or pivots about the female portion subject to a biased cam. The biased cam has a ball bearing that travels within a race formed in the male swivel. The biased cam provides an offset to the connector so that a fuel line in communication therewith avoids an orientation perpendicular to the direction of travel of a vehicle. The breakaway portion then detaches the fuel line cleanly from the swivel that remains with the fuel nozzle.

10 Claims, 6 Drawing Sheets

U.S. PATENT DOCUMENTS

| | | | | |
|---|---|---|---|---|
| 4,060,219 | A | 11/1977 | Crawford | |
| 4,064,889 | A | 12/1977 | Gayle et al. | |
| 4,070,003 | A | 1/1978 | Shames et al. | |
| 4,098,438 | A | 7/1978 | Taylor | |
| 4,119,111 | A | 10/1978 | Allread | |
| 4,121,280 | A * | 10/1978 | Chapman et al. | 362/418 |
| 4,124,228 | A | 11/1978 | Morrison | |
| 4,307,744 | A | 12/1981 | Marrison | |
| 4,392,513 | A | 7/1983 | Parrish | |
| 4,449,545 | A | 5/1984 | Vernor et al. | |
| 4,617,975 | A | 10/1986 | Rabushka et al. | |
| 4,646,773 | A | 3/1987 | Klop et al. | |
| 4,667,883 | A | 5/1987 | Fink, Jr. | |
| 4,674,525 | A | 6/1987 | Richards et al. | |
| 4,690,171 | A * | 9/1987 | Johnston | 137/877 |
| 4,691,941 | A | 9/1987 | Rabushka et al. | |
| 4,779,638 | A * | 10/1988 | Nitzberg et al. | 137/68.14 |
| 4,791,961 | A * | 12/1988 | Nitzberg et al. | 137/614.04 |
| 4,827,961 | A * | 5/1989 | Nitzberg et al. | 137/68.14 |
| 4,886,087 | A | 12/1989 | Kitchen | |
| 4,896,688 | A | 1/1990 | Richards et al. | |
| 4,899,792 | A | 2/1990 | Podgers | |
| 5,014,732 | A * | 5/1991 | Nitzberg | 137/68.15 |
| 5,018,546 | A * | 5/1991 | Carmack et al. | 137/68.15 |
| 5,054,509 | A | 10/1991 | Grantham | |
| 5,115,836 | A | 5/1992 | Carow et al. | |
| 5,135,029 | A | 8/1992 | Anderson et al. | |
| 5,209,262 | A | 5/1993 | Carow et al. | |
| 5,285,807 | A * | 2/1994 | Nitzberg | 137/68.14 |
| 5,297,574 | A | 3/1994 | Healy | |
| 5,365,973 | A | 11/1994 | Fink, Jr. et al. | |
| 5,529,085 | A | 6/1996 | Richards et al. | |
| 5,570,719 | A | 11/1996 | Richards et al. | |
| 5,615,706 | A | 4/1997 | Guertin | |
| 6,182,695 | B1 | 2/2001 | Coates, III et al. | |
| 6,192,934 | B1 | 2/2001 | Coates, III et al. | |
| 6,308,727 | B1 | 10/2001 | Healy | |
| 6,550,817 | B1 * | 4/2003 | Mitchell | 285/147.1 |
| 6,866,299 | B2 | 3/2005 | Coates | |
| 7,980,173 | B2 * | 7/2011 | Carmack et al. | 100/240 |

* cited by examiner

SWIVEL SAFETY BREAKAWAY CONNECTOR

CROSS-REFERENCE TO RELATED PATENTS

This continuation-in-part application claims priority to the non-provisional application bearing Ser. No. 11/503,562 filed on Aug. 11, 2006; now U.S. Pat. 7,575,023 and the subject matter of this application is related to the subject matter of the patents of Arthur C. Fink, Jr. and Thomas O. Mitchell pertaining to Breakaway Concentric Hose Connector, now U.S. Pat. No. 5,365,973, Breakaway Hose Connector, now U.S. Pat. No. 4,827,977, and Butterfly Valve for Fluid Flow Line, now U.S. Pat. No. 4,667,883, and owned by a common assignee.

BACKGROUND OF THE INVENTION

This swivel safety breakaway connector relates in general to means for turning a flow line and stopping fluid passage through a flow line, such as a gasoline line connecting to a nozzle used by motorists for fuel dispensing at a service station, and more specifically to improvements within the swivel useful when a severance occurs at the connection of the nozzle to the line, and when a loss of fuel may be encountered, such as when a vehicle drives off with the nozzle inadvertently still inserted within the vehicle fuel tank. A unique aspect of the present connector is a swivel fitting that orients a fuel line parallel to the direction of motion of a vehicle during a drive off incident, and thus reducing damage to nozzles and providing an additional fuel stop in a dispensing line. This invention is especially useful when applied in a fuel line at its connection to a nozzle, turns parallel to the direction of a vehicle's motion, and functions as a check valve to prevent fuel flow under particular adverse conditions, particularly when the breakaway hose is disconnected.

Numerous valves in the prior art furnish a shut-off of fluid or other fuel flow, and more particularly, such mechanisms normally are utilized in lines where fuel may be flowing, and generally in those situations when the conduit comprises the fuel line leading from a fuel dispenser to its nozzle. For example, as can be seen in the U.S. Pat. No. 2,642,297, to Hanna, a breakaway coupling responds to tension in the line and is held together through a combination of male and female couplings, and detents that provide bearing engagement between the two components. In addition, the U.S. Pat. Nos. 4,617,975, and 4,691,941, to Rabushka, disclose various types of tension actuated uncouplers, for delivering gasoline to a vehicle from a gas pump. These prior patents portray devices that tend to leak, and when any internal pressure is exerted within the fuel line, such as may occur when pumping the fuel, excessive pressures may momentarily arise within the fuel line, and particularly at the location of the uncoupler, and in some instances, has actually forced the coupling device to prematurely come apart. These devices also require separation of their components by force oriented axially.

Existing fuel nozzles have a tip inserted into the vehicle fuel tank connected to valving and a handle opposite the tip as is commonly known. A fuel line connects to the handle generally collinear with the tip. The handle and fuel line generally attain an orientation perpendicular to the surface of the vehicle when the nozzle is inserted for fueling. Occasionally, careless motorists presume the fueling has finished or hear the nozzle click off and drive away from the pump with the nozzle still inserted in the filler neck of the vehicle fuel tank.

When the motorist drives the vehicle away, the nozzle moves with the vehicle and the fuel line extends and becomes taut between the nozzle and the pump. Once the fuel line becomes tighten, a fortunate motorist may have the nozzle slip out of the filler neck and fall to the surface of the dispensing facility. More often, the tightened fuel line causes the nozzle to bend, generally at the tip near the filler neck and the fuel line to strain its joint to the handle. A motorist that drives away abruptly or at high speed will rapidly damage the nozzle, the vehicle, and likely separate the fuel line from the nozzle. Most dispensing stations have a breakaway connector locating where the fuel line connects to the pump. However, when a fuel line separates from the nozzle, existing breakaway connectors do not retain the fuel located in the line between the breakaway connector and the nozzle. In a drive away incident, the fuel remaining within the fuel line spills and becomes an environmental hazard. The dispensing facility then has a broken nozzle, separated hose, and a spill to clean up.

This predicament has generally been recognized by the applicant as primarily occurring because flow lines lack the ability to rotate or to pivot into an orientation parallel to the direction of travel of a vehicle driving off from a pump. Once in that orientation, breakaway connectors function as intended to block the flow of fuel in a separated fuel line near the nozzle connection.

Additionally, breakaway couplings may have unbalanced internal forces. In a nuisance break or drive off, greater fluid forces are exerted in one direction upon one part of the breakaway coupling than is exerted upon the other, and are inherent because of the construction of the breakaway coupling device. When spontaneous and unbalanced high pressures are encountered, the pressure exerted upon one component of the breakaway coupling device in one direction, substantially differs from the fluid pressure that may be exerted upon the other component of the breakaway coupling device, and therefore, this pressure disparity tends to force the coupler to prematurely separate, in an untimely and dangerous fashion. This can and has occurred particularly where the fluid pressure in the hose may undergo a phenomenon that is equivalent to "water hammer."

However, the present invention includes a swivel connecting the flow line to the handle of a nozzle and a breakaway connector in fluid communication with the swivel. Further, the breakaway connector induces forces to balance the internal forces applied against the main O-ring seal. A main O-ring seal endures fluid forces applied from fuel flowing through the invention. The two piece construction and shear pin and locking bearings construction provides counter forces that balance the fluid forces. Generally, the fluid forces tend to urge the connector apart while the forces induced by the present invention are equal in magnitude but opposite in direction to the fluid forces on the main O-ring seal. The present invention orients a flow line parallel to the direction of travel for a vehicle driving off, neutralizes the fluid forces, minimizes nuisance breaks, stops fuel flow from the end of a flow line, and minimizes handle damage.

The lengths of hose, fittings, and nozzles require connection among themselves and to service station pumping facilities. Hoses, fittings, and nozzles have couplings, often near the pump, that breakaway when an errant motorist drives away with a hose in a vehicle, and thus prevent a spill or worse a fiery catastrophe. Until a breakaway, a coupling joins two sections of a fueling line and permits passage of fuel therethrough. As fuel pumps through the flow line, pressure spikes significantly and substantially throughout the hose, momentarily, and even at the location of the coupling, as when the flow is suddenly stopped, as for example, when the fuel tank is full. Hence, leakage at such couplers has frequently occurred in the field, and on occasion, as previously explained, untimely separation of the coupling has happened.

Couplings generally have two halves, a male fitting and a female fitting. the male fitting joins to a hose, fitting or nozzle and has an extended spacer means. The female fitting joins to a second hose, fitting, or nozzle and has a hollow cylindrical center to receive a spacer means. The female fitting engages the coupling by two diametrically opposed shear pins provided towards the rear of the female fitting and a plurality of locking bearings towards the front of the female fitting. Upon inserting the spacer means into the female fitting, the male fitting abuts the locking bearings.

Between the locking bearings and the shear pins, pressure rises and falls depending upon the fuel flow through the coupling and the male fitting and the female fitting. Prior art designs provided an empty space between the locking bearings and the shear pins to absorb pressure fluctuations. In use though, the "water hammer" like effects during fueling induced excessive pressure upon the shear pins which would break repeatedly even with proper fueling and nozzle handling by motorists. Such nuisance breaks occur often and service stations then have to close a pump temporarily while the existing coupling is replaced.

DESCRIPTION OF THE PRIOR ART

Other patents that show various related uncoupling devices include the U.S. Pat. No. 4,449,545, disclosing a poppet valve having a conical surface that is disposed for seating upon a valve seat, when breakage occurs between the plug and socket of the shown valve. A great variety of other types of hose couplers are used in the art, as can be seen in the U.S. Pat. No. 2,777,716, to Gray, showing a socket type hose coupler with reciprocating detent. Another form of quick disconnect coupler and safety check valve is shown in U.S. Pat. No. 4,060, 219, to Crawford. The patent to Shames, U.S. Pat. No. 4,070, 003, also discloses a coupler with automatic shut-off, but the sealing means provided therein has substantial size, and causes significant disruption to the normal flow of fluid through the coupler. Another type of valve assembly is shown in U.S. Pat. No. 4,307,744, to Morrison. An additional form of breakaway safety valve is shown in U.S. Pat. No. 4,064,889, to Gayle, wherein a ball valve prevents the discharge of gasoline vapors in a break.

Other patents showing decoupling devices, for use in flow lines, are shown in the patent to Scheiwer, U.S. Pat. No. 2,536,702, discloses a coupling for use within a flow line, and incorporating the ball type coupling members. Pasker, U.S. Pat. No. 2,599,935, discloses a hydraulic line coupling. Wurmser, U.S. Pat. No. 2,631,872, discloses a quick coupling device for flow lines. Clark, in his U.S. Pat. No. 2,860,893, shows a ball detent type coupling with breakaway feature. Burning, U.S. Pat. No. 3,317,220, shows a releasable fluid coupling. Bolton, Jr., in U.S. Pat. No. 3,334,860, discloses a fluid coupling. Shendure, U.S. Pat. No. 3,715,099, discloses a valved quick-disconnect coupling. Silvana, in U.S. Pat. No. 3,918,679, discloses a universal coupling that allows a flow line to rotate about its longitudinal axis but not turn upwards of ninety degrees. Taylor, in his U.S. Pat. No. 4,098,438, discloses a gasoline spill prevention system. The patent to Morrison, U.S. Pat. No. 4,124,228, shows a pressure-balanced fluid coupling. The patent to Parrish, U.S. Pat. No. 4,392,513, shows a quick disconnect safety coupling. A similar type of coupling assembly is shown in the patent to Norton, et al., U.S. Pat. No. 3,836,114. Livingston, in U.S. Pat. No. 3,138,393, shows a coupling for substantially axially fixed conduits. Morrison, in U.S. Pat. No. 4,124,228, shows a pressure-balanced coupling. These are examples of various prior art breakaway coupling devices, primarily for use within a fluid flow line, and, some are of the breakaway type.

Other patents related to swivel breakaway connectors include a Richards Industries U.S. Pat. No. 5,115,836, that identifies a breakaway hose coupling device, with an integrated swivel mechanism, and for releasably joining two fuel dispensing devices together. The coupling includes a first valve assembly, having a first valve means within a housing. And it includes a second valve assembly, having a second valve housing incorporating an elbow, and having a swivel connecting means for pivotally securing said elbow to said second valve housing. Both valve assemblies can terminate the flow of fuel through their respective housings. Disconnect means is maintained between the first and second valve housings, and allow fluid flow in an engaged position. When excessive force is encountered, the housings disengage, and the flow of fuel is terminated. But, means also prohibits the rotation of the first valve housing with respect to the second valve housing as the first valve housing engages the second valve housing, while allowing the unobstructed axial movement of the first valve housing with respect to the second valve housing to allow for the uninterrupted operation of the automatic disconnect means. This refers to the pins that hold the two housings together, but which can be sheared apart, when subjected to an excessive or disengaging force.

Figure 3:
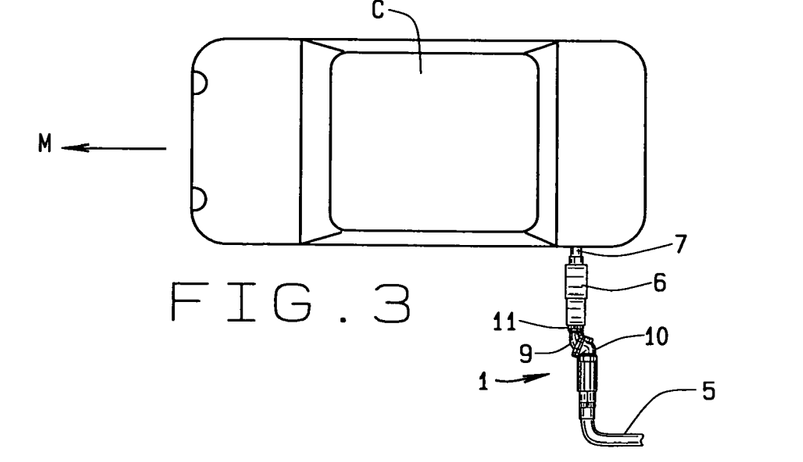

The patent to Carow, et al., owned by Richards Industries, U.S. Pat. No. 5,209,262, shows another breakaway hose coupling with integrated swivel mechanism. This is a breakaway, with swivel, and its threaded member 92, as shown in FIG. 1A, provided for releasably engaging a dispensing device, or nozzle. This coupling includes vapor conduits and pins that connect the various housings. Another patent owned by Richards, U.S. Pat. No. 5,570,719, shows another breakaway hose coupling. This device does connect with the nozzle, apparently at its end 88, although it does not describe any swivel mechanism. A patent to Guertin, U.S. Pat. No. 5,615,706, and assigned to Catlow, is upon a coaxial breakaway coupling with vapor assist check valve. This device apparently connects with the nozzle, as along its portion 174, and it appears that it might have swivel attributes in the vicinity of member 168. A patent to Healy, U.S. Pat. No. 6,308,727, and assigned to Healy Systems, Inc., is upon a fuel dispensing swivel breakaway assembly. This device, as in FIG. 3, is apparently designed for connecting directly to the back end of the nozzle. It includes a breakaway feature, fuel check valve, vapor shut off valve, and the swivel mechanism. The swivel mechanism is apparently along the region 44, while the breakaway area is at the location 102. In FIG. 3, though, it appears that this device may connect with a section of hose, before it attaches into the nozzle. This device also includes shear screws.

Other patents that have issued to the Assignee of the patent application herein include the patent to Fink, Jr., U.S. Pat. No. 4,827,977, upon a Breakaway Hose Coupling, the patent to Fink, Jr., et al., U.S. Pat. No. 5,365,973, for a Breakaway Concentric Hose Coupling, the patent to Coates, II, et al., U.S. Pat. No. 6,182,695, shows a further Breakaway Coupling and Coupler Therefore, and finally, the patent to Coates, et al., U.S. Pat. No. 6,192,934, shows an additional improvement in Breakaway Concentric Hose Coupling.

The difficulty in providing a swivel safety breakaway connector is also shown by the existing means to respond to nuisance breaks. Fuel line providers have added more shear pins to their coupling designs and locate their couplers near the pump rather than at the handle. The greater number of pins reduces the force absorbed by each pin. However, given enough cycles of fueling, the shear pins of greater number still fatigue and break unexpectedly. The variability in time to failure by fatigue leads to heavier and redundant coupling designs as the failure time defies accurate prediction. The couplers near the pump though permits fuel to escape from a hose that separates from the handle of a nozzle.

The present art overcomes the limitations of the prior art. Where, the present invention, a swivel safety breakaway connector, uses a swivel for connection to the handle of a fuel nozzle and the swivel than communicating to a pressure chamber within O-rings to buffer line pressures applied to a coupling thus reducing the incidence of nuisance breaks.

SUMMARY OF THE INVENTION

A safety breakaway connector begins with a male fitting and a female fitting inserted into one another. The female fitting includes a swivel that rotates about an angle to the breakaway connector portion of the invention. The swivel has a female portion connected to the breakaway connector and a male portion that connects to a nozzle. The male portion has an axis parallel to but spaced apart from the axis of the breakaway portion. The male portion rotates about the female portion subject to a biased cam. The biased cam has a ball bearing that travels within a groove of the male swivel. The biased cam provides an offset to the connector so that a fuel line in communication therewith avoids an orientation perpendicular to the direction of travel of a vehicle.

Generally, the male fitting of the connector simply slides into and interconnects with the female fitting for quick installation. Strategically located O-rings provide for fluidic sealing of the various components and withstand pressure variations. The present invention does not require the use of any type of biasing springs, or other mechanisms, to provide for its quick and simple installation.

This invention contemplates the formation of a safety breakaway connector, of the type that may be used at the end of a fuel line where it connects to a nozzle, and preferably a fuel line that conveys gasoline from a dispensing pump to and through a nozzle into a vehicle fuel tank. More preferably, this invention has been designed containing rather unique components that provide for and assure rotation of a fuel line parallel to the direction of a vehicle's travel and the retention of the breakaway connector in its connected and assembled state, and to prevent any leakage, or untimely disconnection from any internally generated forces, such as fluid flow or fluid spike pressures, that may spontaneously occur within the flow line, particularly when the flow of fuel suddenly stops. These features are primarily encountered when a vehicle drives off with the nozzle still in the filler neck and through balancing the internal forces created by fluid flow and static fluid pressure. The biased cam urges the connector portion of the invention off center and the spring loaded locking bearings and shear pins balance the internal forces thus, the net force on the present invention dwindles to zero as it swivels into the direction of motion of a vehicle.

But when a vehicle drives away with an existing nozzle, the connected fuel line remains perpendicular to the vehicle rupturing the fuel line at the nozzle and prevents proper breakaway of the connectors in a timely manner. Further, existing connectors may encounter instantaneous pressure within the connector, where the substantial forces generated internally break them apart, in an untimely fashion.

And, even if any forces generated within the connector are not sufficient to cause an untimely decoupling, such internal pressures, and their misdirected forces, at least have a tendency to cause an incipient partial separation, and enough of an opening within the connector that undesirable leakage will at least occur. Hence, this current invention is constructed containing designed components, fabricated into a particular configuration, so that forces of a moving vehicle orient a fuel line parallel to the direction of the vehicle and any internal forces generated by the fluids passing within the flow line and the connector, are equal to each other, in opposite directions, and therefore, do not affect any substantial and unequal forces within the connector, keep the forces upon the connector in balance and thereby prevent untimely disconnection, or leakage.

Generally, as well known in the art, breakaway hose connectors are usually designed to provide separation when an errant driver pulls away from the dispensing facility pumps, with a gasoline nozzle and fuel line still connected within his vehicle's fuel tank. Under such a drive away situation, it is well documented that a nozzle starts to bend with its attached fuel line then abrupt disconnection of the fuel line at the nozzle occurs, and without the usage of some type of decoupling device, as explained in this current invention, fuel spills from the fuel line where it has separated from the nozzle until a breakaway connector ceases pumping and spillage of fuel upon the grounds of the service station, a very hazardous and disastrous predicament. Utilizing a breakaway connector of this invention, aligns a fuel line for proper activation of the breakaway connector that prevents and curtails further fuel flow from the fuel line where it separates from the nozzle.

In addition, when prior art decoupling devices are affixed on a fuel flow line in routine use, internal pressure spikes or water hammer are generated within the fuel lines. The enormous pressures that instantaneously arise can cause an untimely separation of the prior art decoupling devices, or even at least some undesirable fuel leakage. Hence, this current invention has been designed to prevent any untimely disconnection, because of internal fluid pressures, and even to avoid leakage, by providing designed chambers within the breakaway connector, equalize the disparity of any pressures generated within the connector, and thereby prevent spiked pressures from acting upon the connector, and thereby prevent untimely disconnection.

These are conditions that can cause unwanted breakaway hose connector separations that result in equipment down time. In most instances, these nuisance breaks are caused by an immediate sudden build-up of pressure inside the fueling hose. A sudden pressure increase travels through the hose to the breakaway connector, and forces it apart. The sudden pressure build-up can be caused when a nozzle immediately shuts off while fueling under high volume or high pressure. The sudden build-up of pressure in the fuel line can even cause the connector to separate. However, an even greater pressure can be created when a forced stretching of the hose constricts its internal diameter, as when being abusively used.

The breakaway hose connector of this invention eliminates these nuisance breaks. This invention has a pressure balancing chamber within it that overrides any sudden increase in pressure within the hose, during application. The breakaway connector of this invention will still separate under routine usage and under a drive away situation, when a predetermined force is exerted upon it. And, when this detrimental condition is encountered, the connector separates as planned, thus preventing a disastrous fuel spill. But, as explained, the connector of this device has further been improved so as not to prematurely separate when subjected to internal line shock pressures, a condition that generally causes unnecessary connector breaks, in the prior art.

In addition to the foregoing, the breakaway hose connector of this invention is one that quickly and easily disconnects after a drive away break. Upon breakage, the present connector becomes a minimal number of pieces and shrapnel ejected in the vicinity of the point of usage of the connector. Following a separation, the unit is replaced promptly for restoring a pump to operational status.

Therefore, it is an object of the invention to provide a new and improved safety breakaway connector for fuel nozzles and fuel lines.

It is a further object of the present invention to align a fuel line parallel to a vehicle driving away with a fuel nozzle still in the filler neck of the vehicle's fuel tank.

It is a further object of the present invention to provide a swivel that operates off center from its breakaway portion.

It is a further object of the present invention to provide a swivel that rotates through 0 to 360 degrees.

It is a further object of the present invention to provide a swivel that limits failure of its portion connecting to a fuel nozzle.

It is a further object of the present invention to provide a swivel that allows its portion connecting with a fuel nozzle to pivot.

It is a further object of the present invention to dissipate the abrupt pressure spikes generated within the breakaway connector during its functioning within a flow line thus preventing undesirable fuel leakage, or untimely separation, of the type heretofore caused in other connectors and retaining the shear pins and alleviating nuisance breaks.

It is a still further object of the present invention to provide a known pressure thus regulating the degree of tensioning force to be exerted upon a connector to effect its disconnection.

It is a still further object of the present invention to provide a hose breakaway connector device that is designed to pull apart at a predetermined force, being unaffected by any of the internal fluid pressures generated during its routine usage.

It is a still further object of this invention to provide a pressure chamber to isolate shear pins from "water hammer" effects during fueling as the chamber has generated therein internal fluid pressure that creates a force equal and opposite to the primary force that prematurely causes separation of the connector.

Another object of this invention is to provide a connector device wherein its locking bearings are normally located within seats and which are held generally outwardly thereof, and into a locked engagement during normal and routine usage of the coupler when installed within a fluid flow line.

A further object of this invention is to provide a breakaway connector that may be preset for disengagement of its separable parts upon exertion of a predetermined externally applied tension force, and once separated, its shut off valves effectively stop the further passage of fluid in either direction or from a fuel line section or a nozzle section, and the breakaway connector can be easily reassembled, with a minimum of force, upon the reinsertion of one component into the other.

These and other objects may become more apparent to those skilled in the art upon review of the invention as described herein, and upon undertaking a study of the description of its preferred embodiment, when viewed in conjunction with the drawings.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
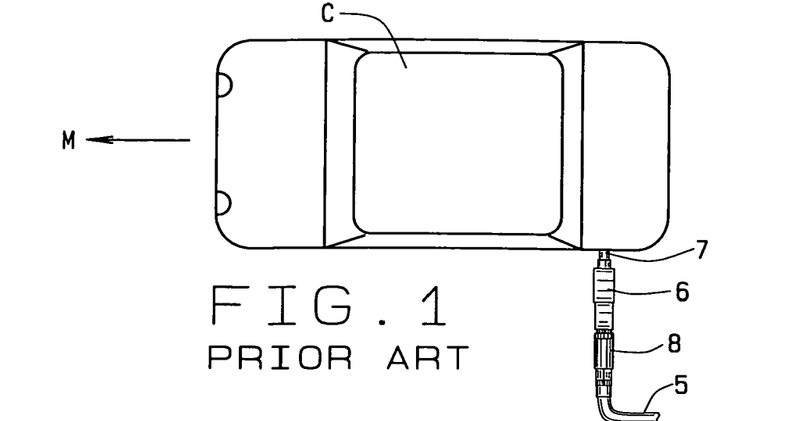
FIG. 1 shows a top view of a vehicle driving away from a pump with an existing nozzle and fuel line connection.

The present art overcomes the prior art limitations of breakaway connectors by providing a swivel that includes a pressure chamber between O-rings to absorb abrupt pressure fluctuations within a connector. Turning to FIG. 1, a car C has an existing nozzle 6 with its tip 7 placed into the filler neck of a fuel tank. The nozzle has an existing breakaway connector 8 extending from the nozzle opposite the tip. The existing connector then joins to a fuel line 5 to communicates to a pump, not shown. A motorist then drives the car C away from the pump in the direction of motion M. As the car moves away from the pump, the fuel line attains a position reflecting the shortest distance from the nozzle to the pump. In this figure, the line becomes nearly perpendicular to the nozzle as the car drives further away from the pump. Once the car stretches the line taught, various actions may occur including bending of the tip 7 and the tip falling from the vehicle, bending of the nozzle 6 and damage to internal valve controls and the nozzle falling from the vehicle, failure of the existing connector 8 where the fuel line 5 separates from the connector and release fuel upon the ground as a spill, and like hazardous events. These events can be prevented by allowing for rotation and realignment of the fuel line so that it does not become perpendicular to the nozzle.

Figure 2:
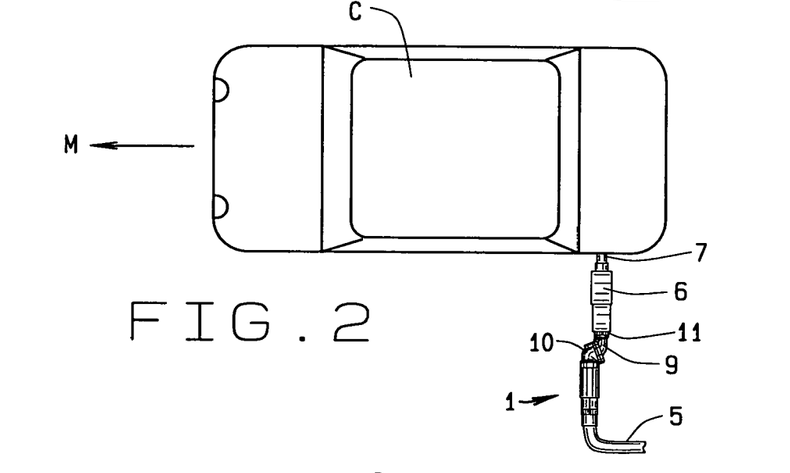
FIG. 2 shows a top view of the present invention with the male fitting of the swivel oriented forward and FIG. 3 shows a top view with the male fitting oriented rearward as a vehicle drives away.

The present invention connects to a nozzle 6 as shown in FIG. 2. The nozzle has its tip 7 placed in the filler neck during fueling of the car C. The present invention has a nut 11 that connects to the nozzle and allows for angular rotation of the invention relative to the nozzle. The nut allows a male swivel 9 to pivot angularly about an axis parallel to the length of the nozzle. The male swivel turns upon a female swivel 10 that is offset from the male swivel. The female swivel 10 has a breakaway connector, shown at 4, attached thereto. The breakaway connector joins with a fuel line that itself connects to a pump, not shown. In this figure, the female swivel 10 is shown towards the front of a car C. With the present invention in place, a motorist may still drive away from a pump.

As the motorist pulls the car forward along direction M, shown in FIG. 3, the nut 11 allows the male swivel 9 to pivot rearward, or opposite to direction M, towards the pump. The nut remains firmly connected to the nozzle however it permits the male swivel to pivot about an axis parallel to the length of the nozzle. With the car forward, the present invention attains a position in FIG. 3 generally opposite that of FIG. 2. Here in FIG. 3, the female swivel becomes closer to the pump. The turning of the male swivel inside the nut, prepares a fuel line to become parallel to the direction M while the nozzle remains in the car C.

Figure 4:
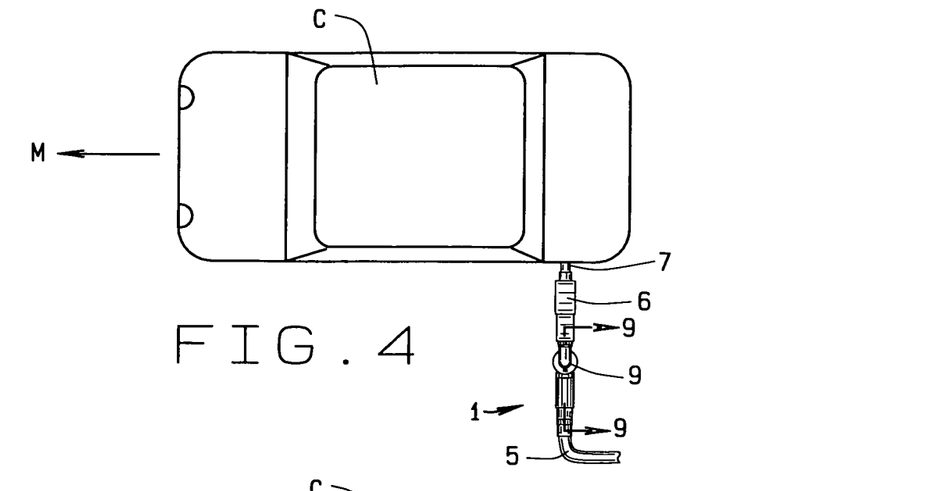
FIG. 4 describes a top view of the present invention in place during fueling of a vehicle and FIG. 5 shows the present invention after the connected fuel line has pivoted in a direction parallel to a vehicle driving away.

Once the female swivel has oriented rearward, or towards the pump, FIG. 4 begins the further positioning of the present invention. As before, a nozzle 6 has its tip 7 inserted into the filler neck of a car C. The present invention 1 joins to the nozzle opposite the tip using the nut 11. Outwardly from the nut, the male swivel 9 extends and turns upon the female swivel locating below the male swivel in this view. The female swivel connects to the breakaway portion of the invention that connects to a fuel line 5. FIG. 4 shows the position of the invention upon a fuel line before the car C begins to move away in the direction M.

As the car moves away, the fuel line 5 remains connected to the pump and attains a linear form, becoming taught. With the car moving in one direction and the fuel line tightening in the opposite direction, the fuel line 5 rotates the female swivel and the breakaway portion of the invention. The breakaway portion of the invention becomes generally parallel to the direction M of the car and the breakaway portion extends towards the fuel line, generally towards the fuel pump, not shown.

Figure 5:
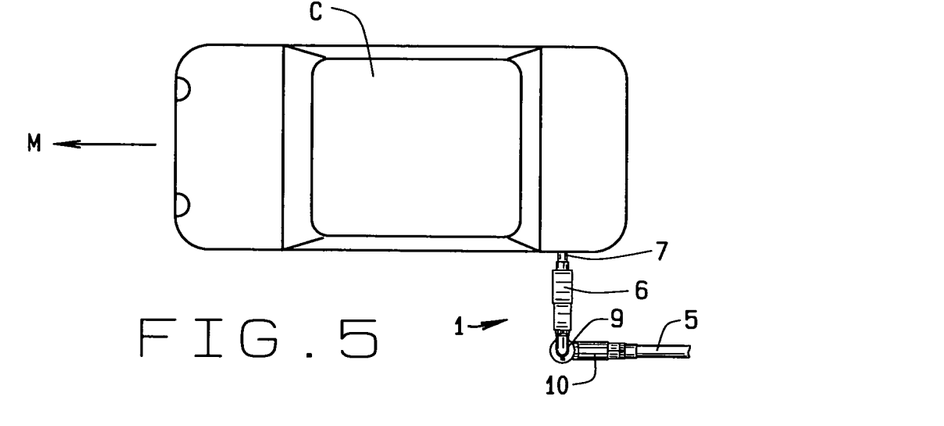

Because a motorist may ignore the fuel nozzle in the filler neck, the car C proceeds away from the pump in the direction M. The nozzle 6 has its tip 7 still in the filler neck and the motion of the car transmits a pulling force through the nozzle into the swivels 9, 10 of the invention. Once the pulling force exceeds a predetermined amount, approximately 200 lbs to approximately 250 lbs, the breakaway section of this invention separates. In doing so, the separated fittings of the breakaway section cease the flow of fuel from the end of the fuel line 5 and from the nozzle 6. The separated fittings also then permit the car C to drive away without dragging a fuel line a great distance.

Figure 7:
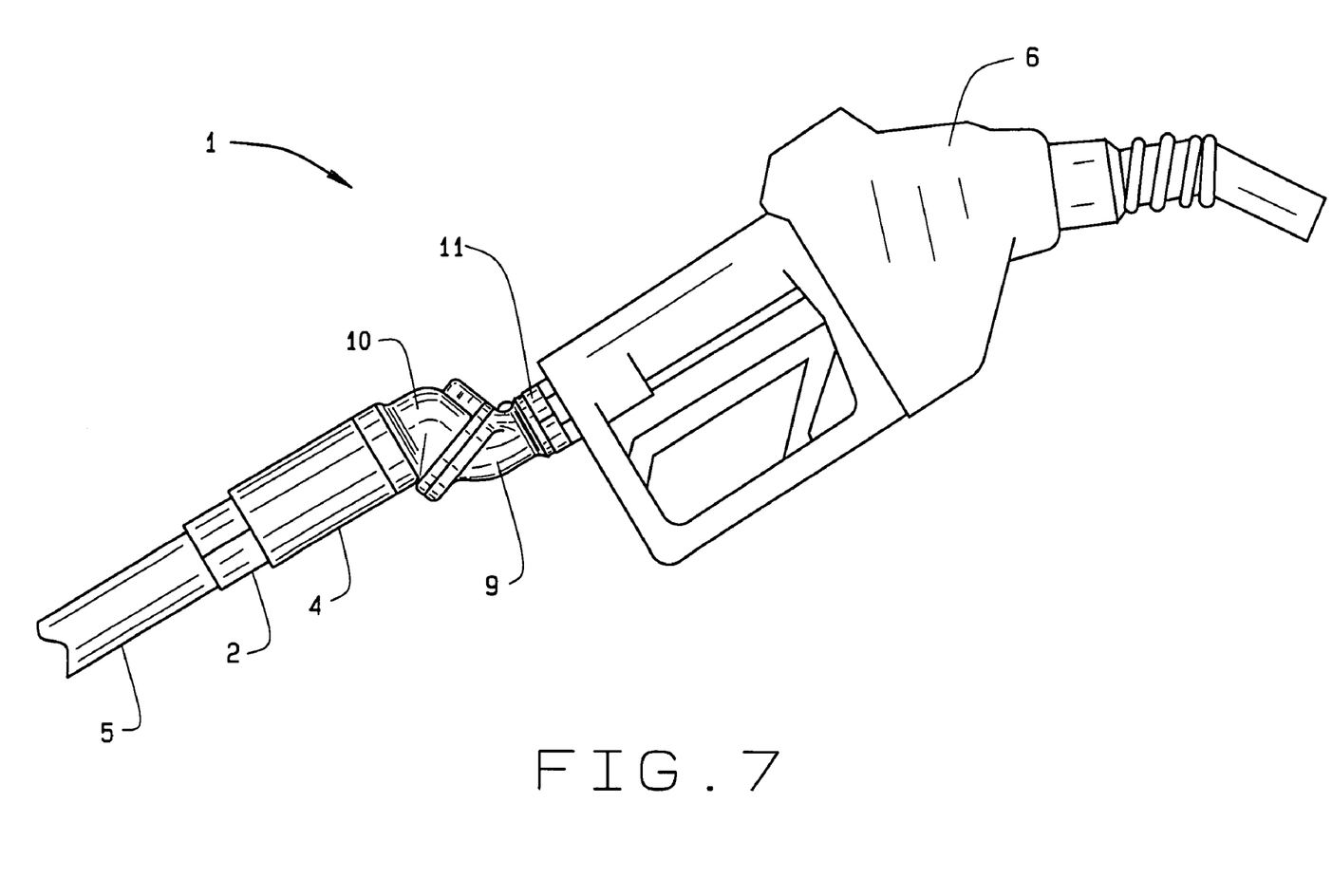
FIG. 7 illustrates the swivel safety breakaway connector of this invention connecting to a fuel dispensing nozzle and a fuel line.

Having described the general operations of the present invention, FIG. 7 shows the invention connected to a nozzle 6 and a fuel line 5. The invention has a threaded nut 11 upon the male swivel 9 and the threaded nut inserts into a threaded aperture upon the handle of the nozzle. The male swivel turns upon a common plane with the female swivel 10. The direction of fuel flow is spaced apart between the male swivel and the female swivel. The female swivel and breakaway portion, here shown as 4, are then offset at an angle away, or outwardly, from the direction of fuel flow through the male swivel. The breakaway portion secures to the female swivel and extends away from the swivel for connection to a fuel line through the threaded fitting as at 2 that secures upon a threaded fitting of the fuel line, not shown.

Figure 8:
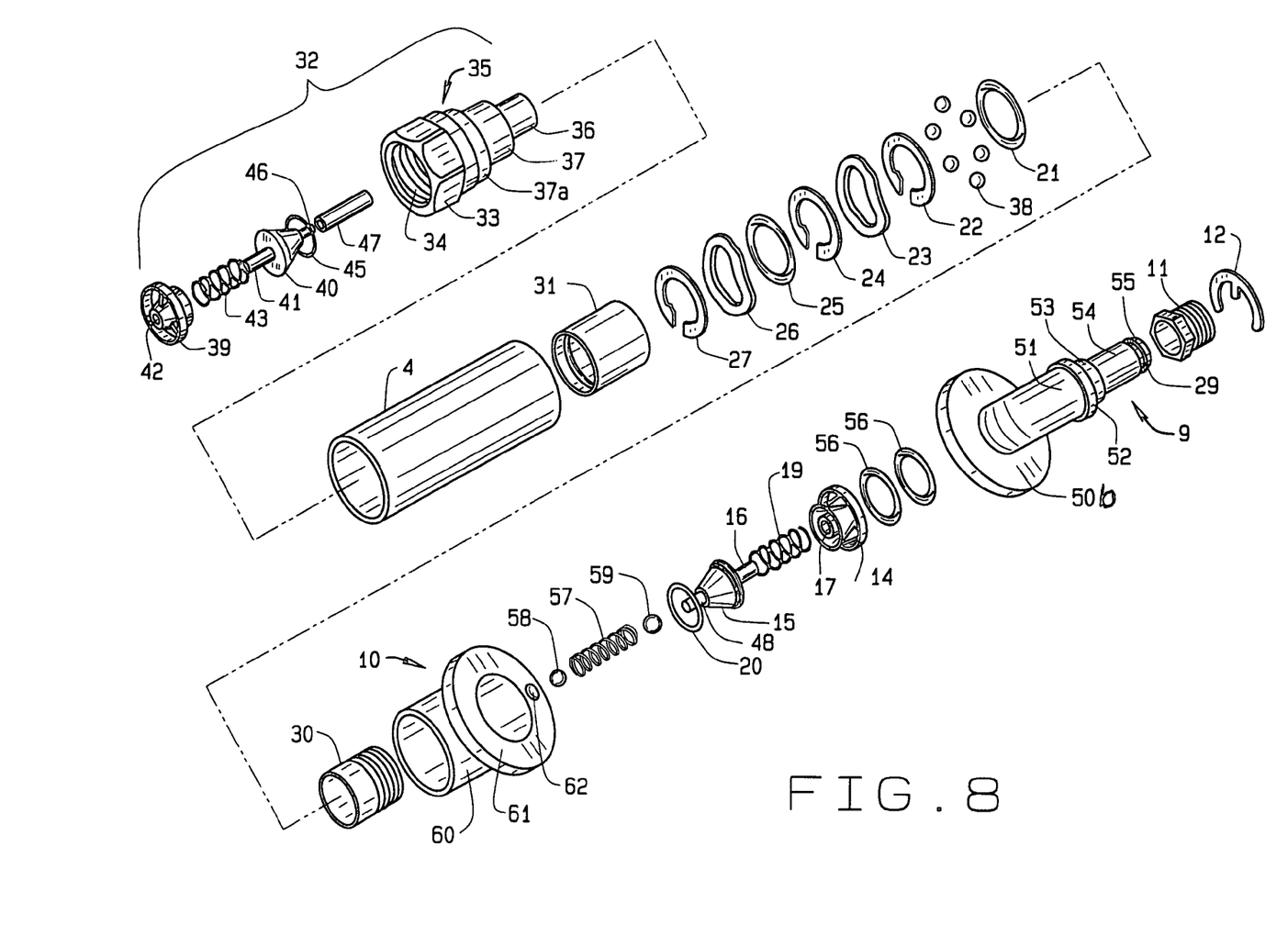
FIG. 8 describes an exploded view of the swivel safety breakaway connector.

Turning to FIG. 8, the components of the invention are shown in an exploded view following the orientation of the invention shown in FIG. 7 as it is generally used.

The connector connects at one end with a fuel line hose 5, or which may connect at its other end with a fuel dispensing nozzle 6, as shown, or with additional hose. As can be seen, a nut like member, as at 11, provides for the invention's engagement onto a nozzle. The nut secures upon the male swivel 9 by a swedge 12. The male swivel has a base 50b, generally round, with a central tube 49 extending therefrom generally towards the interior of the invention. The tube has less diameter than the base. Within the base and generally outwardly of the tube, the male swivel has a race 50, or a depression away from the tube, extending around the perimeter of the base. The race has a generally semicircular shaped cross section to receive a ball bearing as later described. The race includes a cam stop 50a that blocks continuous passage through the race. The cam stop rises to the surface of the plane 61 when the swivel is assembled. The cam stop is generally aligned with the centerline of the shaft 54 in its direction for installation within the handle of a fuel nozzle as later shown in FIG. 8A. The base joins with a hollow shoulder 51 that narrows in the direction opposite the tube and towards the exterior of the invention. The shoulder gently curves and narrows in the direction of the nut while communicating fuel therethrough. The shoulder has an outward appearance shown in FIG. 7. Opposite the base, the shoulder adjoins a collar 52 that has a diameter greater than that of the shoulder. Outwardly from the collar 52, the male swivel steps inwardly in diameter to form the second shaft 53. The second shaft, being hollow, also has a diameter less than the collar and the shoulder. The second shaft adjoins a hollow first shaft 54 that has a lesser diameter than the second shaft. Opposite the second shaft, the first shaft 54 has a slot 29 upon its perimeter. And outwardly from the slot 29, the first shaft ends with a tip 55, generally beveled. The slot receives the swedge 12 for securing the nut 11 to the male swivel 9. The nut rotates upon the first shaft and allows the present invention to pivot as previously described in FIGS. 2, 3.

The tube 49 of the male swivel 9 admits fuel to the nozzle and into the invention. The tube has two second O-rings 56 that seal its connection to a spider like mount 14, which is fixed stationary within the female swivel 10, and provides a means for supporting the poppet valve 15 within the fitting. The poppet valve 15 contains a stem 16 extending outwardly of the invention, and the stem is designed for sliding and fitting within the support sleeve 17 formed on the mount 14. A spring 19 surrounds the stem 16, and biases against the back surface of the poppet valve 15, and thereby normally biases the said poppet valve forwardly within the female swivel 10, and into engagement with the formed valve seat within female swivel. A first O-ring 20 mounts upon the surface of the poppet valve 15, to provide sealed closure for the poppet valve, when it enters into closure against its cooperating valve seat.

Figure 8A:
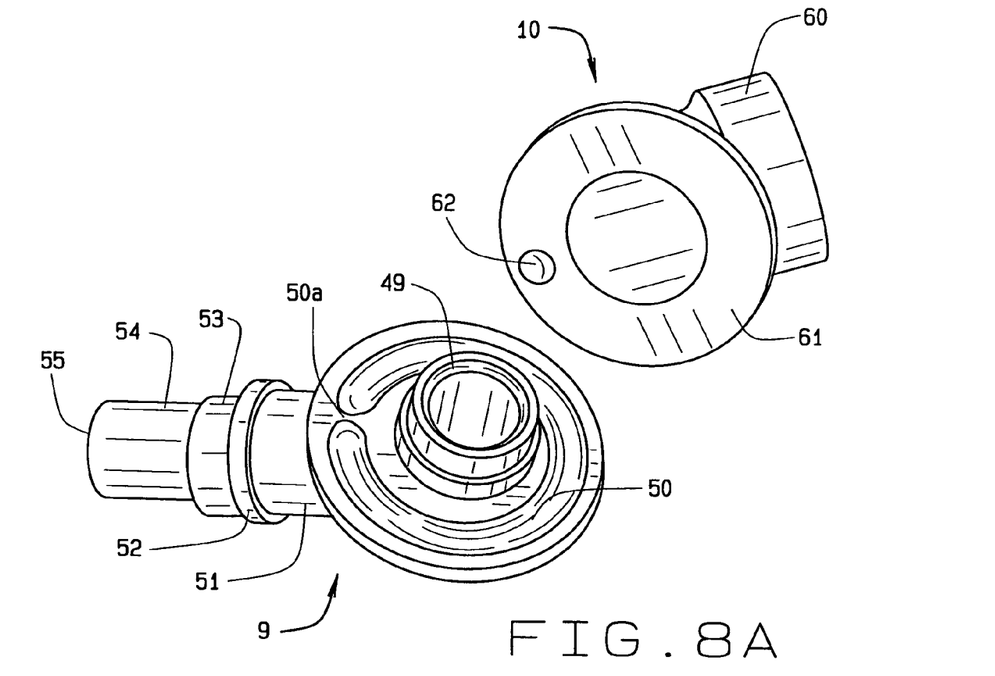
FIG. 8A illustrates a detailed view of the race and cam of the male swivel and detent of the female swivel of the invention.

The female swivel has a base, generally round of similar outside diameter of the base of the male swivel. The base of the female swivel has a generally flat plane, as at 61, that abuts the race 50 of the male swivel. The male swivel and the female swivel rotate, or pivot, about on a common plane established by the plane 61. The plane 61 has a detent 62, generally cylindrical in shape and recessed below the plane 61. The detent receives a first ball bearing 58, approximately ¼ inch diameter. A detent spring 57, has two opposite ends, and one end rests upon the first ball bearing 58 and the other ends rests upon a second ball bearing 59, approximately 17/64 inch diameter. The detent spring supplies approximately 10 to 15 pounds of force and preferably 12 pounds. The second ball bearing 59 has a press fit into the detent for securing the detent spring 57 and the first ball bearing within the detent. The first ball bearing 58 travels within the race 50 of the male swivel and passes over the cam 50a as shown in FIG. 8A. In traversing the cam, the first ball bearing compresses against the detent spring. The bias of the detent spring upon the first ball bearing at the cam in the race, urges the male swivel 9 to generally position itself approximately 15 to 30 degrees from the centerline of the female swivel 10. Behind the plane 61, the female swivel has a shoulder 60 generally of lesser width than the plane. The shoulder 60 is curved and gently curves opposite that of the shoulder 51 of the male swivel 9 and narrows in the direction of the nut while communicating fuel from the female swivel through the male swivel. This shoulder 60 of the female swivel 10 has an outward appearance shown in FIG. 7.

Opposite the plane 61, the shoulder has internal threading that receives a male insert 30. The male insert has a hollow cylindrical form with thin walls threaded upon one end. Within the male insert, a plurality of devices seal the breakaway connection of this invention. Provided for firm mounting of the end of the breakaway portion of the invention is a third O-ring 21. Outwardly of the third O-ring 21, a plurality of locking bearings 38 seat upon the end of the breakaway connection. Then behind the locking bearings 38, a retainer clip 22 expands to the inner wall of the male insert 30. Behind the retainer clip 22, a flat spring 23 biases outwardly. Adjacent to the flat spring 23, a second retainer clip 24 again expands outwardly to the nearby inner wall. A washer 25 generally abuts the second retainer clip as shown. Then a second flat spring 26 also biases outwardly. The second flat spring remains in place with a third retainer clip 27. The preceding devices fit within the male insert 30 and then accommodate an outer sleeve 31 having a generally hollow cylindrical shape. The devices outward of the third O-ring, the locking bearings 38 and the springs and clips denoted by 22-27, provide passage for fuel through them. The outer sleeve 31 fits snugly within the cylindrical guard 4. The guard is an elongated cylinder that extends outwardly from the female swivel 10 towards the fuel line 5.

Opposite the outer sleeve, the guard receives a fitting 32, that is in opposition to the poppet valve 15 within the female swivel 10. This fitting includes a nut like formed member 33, having a series of internal threads located therein, as at 34, which likewise are designed for providing a connection of this fitting to a fuel line, as explained. The fitting 32 includes a female insert 35, integrally formed with the nut like member 33, and as can be seen, the insert has a tip 36 at an end of a shaft 37. The tip has a narrower diameter than the shaft but remains hollow for the passage of fuel. The shaft also has a lesser diameter than a collar 37a, generally hollow though of a shorter length than the shaft. The collar adjoins the nut 33.

Provided for fixed mounting within the female insert 35 is the spider mount 39, and it likewise supports a poppet valve 40, whose rearward extension 41 fits within the stem support 42, formed within the mount 39, and with the spring 43 normally biasing the poppet valve 40 against the valve seat formed within the fitting 32. An O-ring 45 fits on the valve 40, so as to assure a fluid tight seal when the valve is seated upon its valve seat. A forward extension 46, towards the interior of the invention or forwardly of the poppet valve 40, supports a separator tube or spacer 47, such that when the fitting 32 is installed within the female swivel 10 and the guard 4, the separator stem 47 biases against the stem 48 of the oppositely aligned poppet valve 15 proximate the male swivel 9, and thereby forces both of said poppet valves to unseat from their respective valve seats. In doing so, the poppet valves remain open to allow for fuel flow through the invention.

Figure 9:
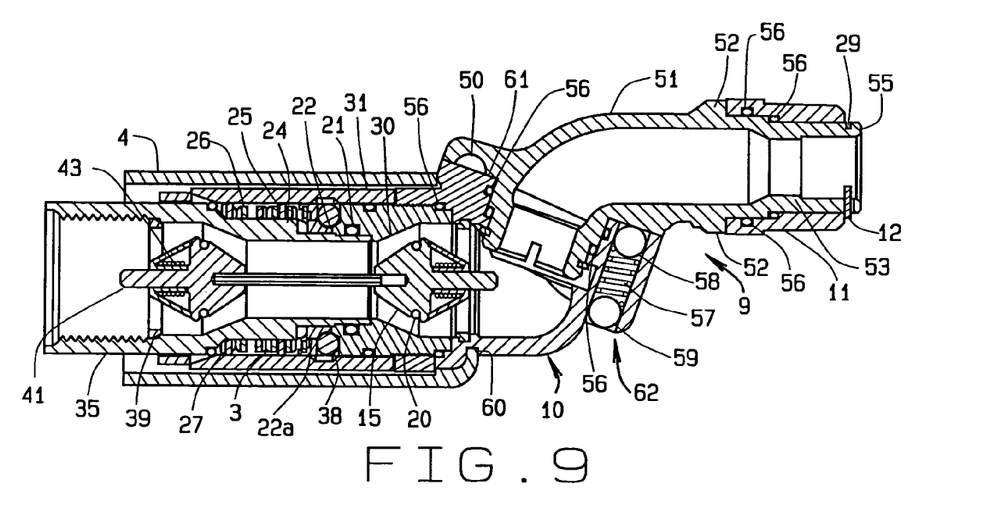
FIG. 9 is a longitudinal sectional view of the swivel safety breakaway connector in its assembled and usable condition; and, FIG. 10 is a sectional view of the swivel safety breakaway connector with swivel turned and the female and male fittings separated.

In referring to FIG. 9, which provides a cross-sectional longitudinal view of the safety swivel breakaway connector of this invention, the connector is shown assembled, ready for usage and application having a fuel line threadily engaged at one end and a nozzle connected at the other end. These components will threadily connect with the threaded nut 11 or the threaded means 34, provided at either end of the respective fittings 10 and 32.

Figure 6:
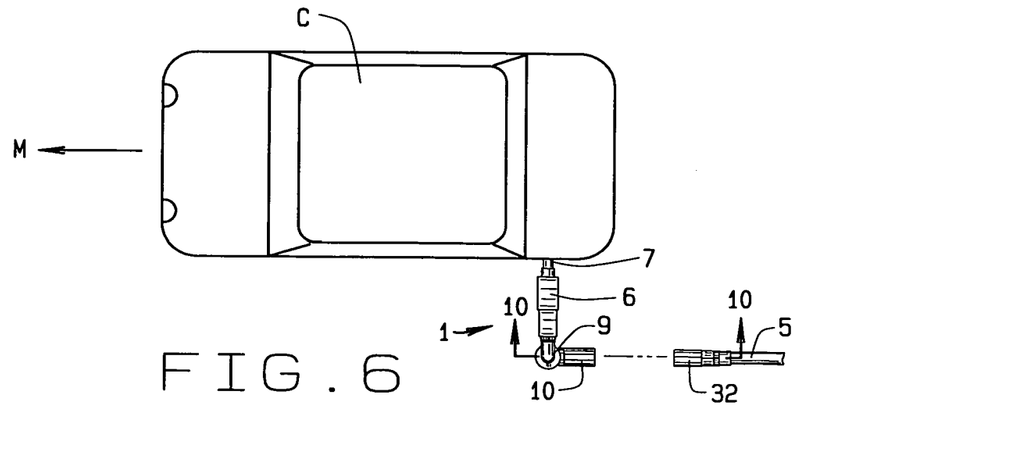
FIG. 6 shows the swivel safety breakaway connector of this invention remaining connected to a fuel dispensing nozzle while the male portion of the breakaway connector remains with a fuel line no longer connected to the swivel as a car drives away.

The female fitting 32 enters the outer sleeve 31 and then the male insert 30. The outer sleeve 31 is cylindrical and slightly wider than the female insert. The outer sleeve surrounds the female fitting but forms an annular space between the outer sleeve and the shaft 32 and tip 36 of the female insert 35. Where the male insert 30 abuts the shaft 32 inside of the outer sleeve, the female fitting 32 has a plurality of locking bearings 38. The locking bearings 38 remain fixed in their locations at the inward end of the male insert under the biasing action of a ring latch as at 22a. The ring latch expands the locking bearings outwardly into a perimeter groove in the interior of the outer sleeve and the flat spring or E-ring as at 23 keeps the locking bearings in position. As mentioned earlier, pressure fluctuations, vibrations, and other forces are transmitted to the connector then through the male fitting and the female fitting. The grooves and first retaining ring permit the locking bearings to move slightly upon intermittent light forces. Upon sufficient axial force being applied to the female fitting, as shown in FIG. 6, the female fitting 32 will slide away from the male insert 30 and the remainder of the swivel, then release the locking bearings which allows the female fitting 32 to separate from the remainder of the breakaway connector.

The various component parts as previously described can be readily seen assembled within this view, and include the male swivel 9 which has its nut 11 upon the shaft 54 and having the second shaft 53 behind it as noted. The tube 49 within the race 50 supports the poppet valve 15 within the male swivel, and arranges it for seating against valve seat, shown proximate 30, as when the connector separates. In addition, the guard 4 connects onto the female fitting 32, and is disposed for limited sliding movement thereon, but which is reasonably locked in position. The male swivel 9 also includes an outer surface 50b.

The fitting 32 is disclosed inserted within the opposite end of the guard 4 and the outer sleeve 31, and carries the detent bearings 38 outwardly of its tip 36 for placement within a groove upon the interior of the outer sleeve at the end of the male insert 30, shown proximate reference character 38. The fitting seats at its one end, as previously explained, and likewise incorporates its mount 39, for retaining the poppet valve 40 in proximity and in alignment with the valve seat. But, when the connector is assembled, the spacer means 47 biases against both of the poppet valves, and displaces them from their respective valve seats, so as to provide a clear flow path for fuel through the connector. This flow path could be in either direction, but as explained herein as moving from left to right during dispensing of fuel into a vehicle fuel tank, simply for illustrative purposes.

The various pressures withstood by the connector of this invention are calculated to furnish the required strength to maintain the breakaway hose connector in its operative configuration, and to resist separation. Obviously, this type of pressure can be varied, based upon the amount of axial force resisted by a given locking bearing and its biasing springs, retainers, and latches built into the device. But, in the preferred embodiment, it has been designed to withstand tensioning forces exerted upon the fuel line hose of at least one hundred pounds, and preferably two hundred pounds. Most of this force is attained through the shear strength of the locking bearings engaging the groove within the outer sleeve. However, upon separation of the female insert from the male insert, the locking bearings fall out of the female insert. The male fitting and the female fitting may reconnect upon proper replacement of the locking bearings, often by factory service personnel on site or back at the factory.

This view, FIG. 9, also shows the operation of the detent 62 and the race 50. The detent biases the ball bearing 58 against the race 50. The detent opens through the plane 61 of the female swivel that adjoins the male swivel and both swivels rotate, or pivot, about the plane 61. The plane on plane interaction of the swivels can be seen where ball bearing 58 abuts a high point of the race 50 towards the right of the shoulder 51 of the male swivel. On the left of the shoulder 51, the race has a deep portion shown above the plane 61 of the female swivel. The deep portion of the race allows the female swivel to turn freely through approximately 360 degrees of rotation about the plane. The low point of the race generally urges the female swivel away from an inline orientation with the male swivel and prevents damage from a perpendicular orientation as shown in FIG. 1.

All of the components as previously described, are assembled in conjunction with the male swivel 9, and in combination with the guard 4 containing the breakaway components of the female swivel 10. The male swivel and the female swivel allow a break in their mutual connection under certain conditions: a drive off by vehicle with the fuel nozzle still in the tank.

To produce a normal disengagement of the connector device, a tensioning force is exerted upon the fuel line in which the connector is located as previously described for FIGS. 4-6. When a tension force is exerted upon the connector, the force is directly upon the female swivel 10 and the male swivel 9 and particularly the female insert 35. As the tension builds, in this embodiment, the same force is exerted upon the fitting 35, through its interconnected fuel line, and this force tends to pull the fitting 35, slightly out of its outer sleeve 31 inside the guard 4, in an effort that tends to withdraw the fitting 35 slightly from within the outer sleeve 31 to provide for an instantaneous disengagement of the fitting 35 from the male insert 30 inside of the shoulder 60 of the female swivel 10, as can be readily seen in FIG. 10. As this occurs, simultaneously the spacer means 47 allows the poppet valve 40 to be spring biased against its valve seat within the female fitting 35 as the fuel line falls away, while simultaneously, the poppet valve 15 is spring biased against its respective valve seat inside the shoulder of the female swivel remaining with the errant vehicle.

Figure 10:
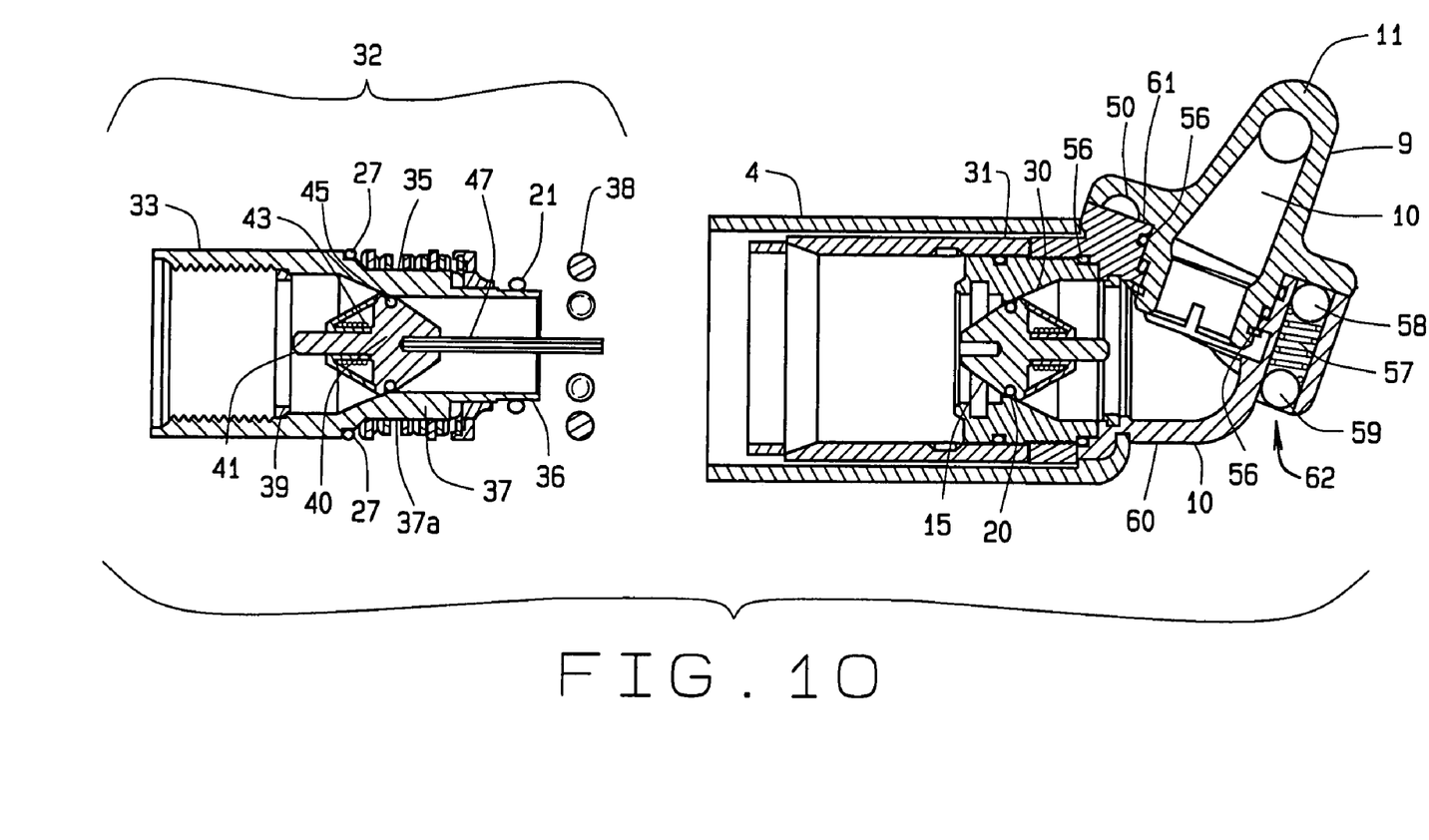

Thus, when disconnection has occurred, because of the exertion of the tensioning force upon the fuel line in which the connector inserts, and through the exertion of such force physically upon the connector 1 itself, the connector disconnects, the various poppet valves instantaneously close, preventing the flow or leakage of any further fuel from the end of the fuel line or the handle of the nozzle, even though a break has occurred, thereby preventing the hazardous spillage of fuel or other fluids onto the surrounding area, as previously explained.

FIG. 10 illustrates the female fitting 35 separated from the male insert 30. The female fitting retains the spacer means 47 as the poppet valve seats itself as the spring 43 expands under its bias. The female fitting 35 carries the O-ring 21 upon the tip 36 of the shaft 32. Detached and separated from the male insert within the outer sleeve 31 carries the majority of the present invention. Also at the forward edge of the outer sleeve 31, a plurality of locking bearings 38 falls out of the space between the forward extension and an inner groove toward the end of the male insert 30.

Thus, this invention provides a safety swivel breakaway connector that prevents untimely spillage when a disconnection occurs where a fuel line separates from a nozzle during a drive away situation. The connector includes internal poppet valves that seal off the flow of fuel for the handle of the nozzle and the end of a separated fuel line. The swivel portion of the invention generally remains away from the center line of the male swivel, or the center line of the nozzle. This offset allows the connector portion to instantaneously orient itself towards the fixed end of the fuel line, or pump, from prompt disconnection when the predetermined tension force is reached. The swivels cooperate so that the connector portion turns thus reducing mechanical failure of the cast portions of the inventions as when the fuel line remains parallel to the nozzle center line, shown before as FIG. 1. The connector also accommodates the various internal pressures that arise from pressure spikes that occur as the handle is engaged and disengaged by the user, as fuel flows through the fuel line and the handle, and under atmospheric conditions.

From the aforementioned description, a safety swivel breakaway connector has been described. This swivel connector is uniquely capable of orienting its breakaway portion parallel to the direction of motion of an errant vehicle and a fuel line still connected to the vehicle. This swivel connector also has a swivel locating proximate the handle of a fuel nozzle thus allowing rotation of the entire connector as needed during usage and a drive away situation. Though the outer sleeve 4 and other components are shown and described with round cross-sections, other cross-sections are possible in alternate embodiments. This swivel breakaway connector and its various components may be manufactured from many materials including but not limited to polymers, low density polyethylene, high density polyethylene, polypropylene, nylon, ferrous and non-ferrous metals, their alloys, and composites.

Variations or modifications to the subject matter of this invention may occur to those skilled in the art upon reviewing the development as described herein. Such variations, if within the scope of this development, are intended to be encompassed within the principles of this invention, as explained herein. The description of the preferred embodiment, in addition to the depiction within the drawings, are set forth for illustrative purposes only.

I claim:

1. A swivel fluid breakaway connector for pivotally connecting a fluid line hose to a nozzle, comprising:

a male swivel adapted to pivotally connect to a nozzle, said male swivel admitting fluid and having a centerline;

a female swivel in fluid communication with said male swivel, said female swivel connecting with a fluid line hose, said female swivel pivotally connected to said male swivel, said female swivel turning upon said male swivel, wherein said female swivel capable of turning upon an axis at different angles relative to the centerline of said male swivel;

said male swivel having a tubular shoulder, said female swivel also having a tubular shoulder, both said female swivel and said male swivel formed having a base, each base having a flat surface, each base of said swivels integrally formed with the respective tubular shoulder of said female and male swivels;

said base of the female swivel and the base of the male swivel connected for laying flush against the flat surface of each other, said male swivel base having a race formed within its surface and extending in a circular configuration substantially around the perimeter of the surface of said male swivel base, said female swivel base having a detent formed therein and extending above the surface of said female swivel base, said detent extending into said male swivel base race, whereby said detent travels within said race to allow said female swivel to turn relative to said male swivel and to thereby vary the angle of said female swivel relative to said male swivel during usage, the proximate ends of the race forming a cam stop to prevent the female swivel from entering into axial alignment with the male swivel;

a breakaway portion extending from said female swivel and in fluid communication with said female swivel and the adjacent section of the fluid hose;

said male swivel, said female swivel, and said breakaway portion providing passage for fluid therethrough;

said breakaway portion having two spaced apart check valves, a valve seat for seating of said respective check valves after decoupling of said breakaway connector, one of said check valves having an extension therewith to hold the check valves unseated from their respective valve seats and allowing fluids and vapors to pass therethrough during normal usage, said extension separating from said check valves during breakaway of said connector during abnormal usage wherein said check valves seat upon their respective valve seats and thereby ceasing flow of any fluid and vapors from the fluid line out of said breakaway and from the nozzle or out of the female swivel;

said breakaway portion having connector mounts for securing said check valves therein, said connector mounts having an inner concentric passage allowing fluid flow therethrough; and said check valves having cooperating internal vapor passages, said vapor passages cooperatively connecting to said inner concentric passage of each connector mount to allow vapors to flow through said inner connected passage and out through said connector mount for return to the dispenser during normal fluid dispensing.

2. The swivel fluid breakaway connector of claim 1 and further comprising:

said male swivel having at least one shaft for passage of fluid therethrough, a tip upon said at least one shaft, a nut generally cylindrical with exterior threads locating upon said at least one shaft proximate said tip, said nut rotating upon said shaft and adapting for connection to a nozzle, wherein said male swivel pivots said connector upon said shaft while said nut remains connected to a nozzle.

3. The swivel fluid breakaway connector of claim 1 and further comprising:

said detent having a first ball bearing, a spring, and a second ball bearing, said first ball bearing provided for traveling within said race to allow the female swivel to pivot to various angles relative to the connected male swivel, and said spring positioning said first ball bearing outwardly of said second ball bearing within the formed detent.

4. The swivel fluid breakaway connector of claim 2 wherein said female swivel attains an angle relative to said male swivel of approximately 15 degrees to approximately 30 degrees.

5. The swivel fluid breakaway connector of claim 2 wherein the angle between said female swivel and said male swivel can be adjusted.

6. The swivel fluid breakaway connector of claim 3 wherein said second ball bearing has a press fit into said detent and said spring provides approximately 10-15 pounds against said first ball bearing.

7. The swivel fluid breakaway connector of claim 1 wherein the tensile force required for disconnection of said breakaway portion from said female swivel is variable.

8. The swivel fluid breakaway connector of claim 1 wherein the tensile force required for disconnection of said breakaway portion from said female swivel is approximately 200-250 pounds.

9. The swivel fluid breakaway connector of claim 1 further comprising:

said breakaway portion including a female insert receiving one of said check valves, said female insert adapting to connect to a fuel line;

said female insert locating within an elongated cylindrical guard, said guard containing a cylindrical outer sleeve of lesser diameter than said guard, said outer sleeve being coaxial with said guard and said female insert;

at least one retainer, at least one washer, at least one spring, a plurality of locking bearings, and at least one O-ring locating proximate said outer sleeve opposite said female insert;

said locking bearings locating between said outer sleeve and said female insert; and, a male insert generally cylindrical of lesser diameter than said outer sleeve and locating within said female swivel.

10. The swivel fluid breakaway connector of claim 9 further comprising:

said outer sleeve having an internal perimeter groove receiving said locking bearings.

* * * * *